United States Patent [19]

Hays

[11] Patent Number: 5,669,967

[45] Date of Patent: Sep. 23, 1997

[54] PIGMENT COMPOSITIONS

[75] Inventor: Byron G. Hays, Chagrin Falls, Ohio

[73] Assignee: Engelhard Corporation, Iselin, N.J.

[21] Appl. No.: 672,386

[22] Filed: May 30, 1996

[51] Int. Cl.⁶ .......................... C09B 29/36; C09B 29/03
[52] U.S. Cl. ..................... 106/496; 106/23 J; 106/23 K; 106/402; 106/498; 534/781; 534/784; 534/791; 534/792; 534/793
[58] Field of Search ....................... 106/402, 496, 106/498, 23 K, 23 H; 534/793, 792, 781, 784, 791

[56] References Cited

U.S. PATENT DOCUMENTS

| | | | |
|---|---|---|---|
| 3,341,513 | 9/1967 | Wegmuller et al. | 534/781 |
| 3,423,393 | 1/1969 | Klein | 534/781 |
| 3,905,952 | 9/1975 | Speck | 534/784 |
| 4,045,425 | 8/1977 | Hunter | 534/781 |
| 4,486,237 | 12/1984 | Paffoni et al. | 106/445 |
| 4,594,411 | 6/1986 | Henning | 534/784 |
| 4,980,458 | 12/1990 | Hari et al. | 534/575 |
| 5,047,517 | 9/1991 | Deucker | 534/784 |
| 5,457,188 | 10/1995 | Zimmermann | 106/496 |
| 5,482,546 | 1/1996 | Eida | 534/781 |

FOREIGN PATENT DOCUMENTS

| | | |
|---|---|---|
| A261 69 81 | 10/1977 | Germany . |
| A411 13 48 | 10/1992 | Germany . |
| A5067841 | 6/1975 | Japan . |
| A105 653 | 7/1924 | Switzerland . |
| A691475 | 5/1953 | United Kingdom . |
| A123 9548 | 7/1971 | United Kingdom . |
| A141 0862 | 10/1975 | United Kingdom . |
| A148 8599 | 10/1977 | United Kingdom . |
| A151 6223 | 6/1978 | United Kingdom . |
| A2 114 991 | 9/1983 | United Kingdom . |
| A2 185 491 | 7/1987 | United Kingdom . |

*Primary Examiner*—Mark L. Bell
*Assistant Examiner*—Scott L. Hertzog
*Attorney, Agent, or Firm*—Raymond F. Keller

[57] ABSTRACT

Disclosed are compositions comprising one or more compounds characterized by the formula:

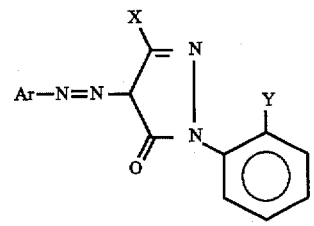

wherein X is a hydrocarbyl, carboxylic acid ester, sulfonic acid ester, carboxylic acid amide or sulfonic acid amide group; Y is a hydrocarbyl, halogen or hydrocarbyloxy group; Ar is an aromatic moiety characterized by the formula:

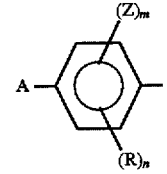

wherein A is a halogen group; each Z is independently a —COOH or —SO$_3$H group, or salts of such groups; m is 1 or 2; each R is independently a halogen, hydrocarbyl, hydrocarbyloxy, carboxylic acid ester, sulfonic acid ester, carboxylic amide, imidazolone, sulfonic acid amide, nitro group; and n is 0, 1 or 2.

A process for preparing azo dyes, the dye compositions prepared by this process and the azo pigments derived from such dyes are also disclosed. Paint, ink and plastic compositions containing the foregoing pigments compositions are disclosed.

26 Claims, No Drawings

PIGMENT COMPOSITIONS

BACKGROUND OF THE INVENTION

1. Field of the Invention

This invention relates to novel azo green-shade yellow pigments, azo dyes, processes for their preparation and to paint, plastic and ink compositions containing such pigments.

2. Description of Related Art

To impart clean green-shade yellow colors to plastics, diarylide azo yellows such as Colour Index (C.I.) Pigment Yellow (P.Y.) 14 and 17 have typically been used for the past half century. It was reported, however, in R. Az et al, *Dyes and Pigments*, 15, 1 (1991), that diarylide yellows are degraded to potentially carcinogenic by-products (e.g. 3,3'-dichlorobenzidine) in plastics processed above 200° C., a temperature lower than those used in processing most plastics (e.g., 250°–330° C.). As a result of these concerns, most plastics processors today use C.I. Pigment Yellow 62:1, the calcium salt of diazotized 4-amino-3-nitrobenzene-1-sulfonic acid coupled into acetoacet-2-methylanilide. Although C.I. P.Y. 62:1 imparts clean green-shade yellows, tinctorially it is only about one-third as strong as C.I. P.Y. 17 and tends to darken at higher plastics processing temperatures. There is a need for stronger green-shade yellow pigments with better heat stability.

While azo yellow pigments made by coupling into 1-phenyl-3-methyl-5-pyrazolone or its derivatives are known to those of ordinary skill in the art, such pigments are red shade yellows and, therefore, not suitable replacements for green shade yellows such as C.I. P.Y. 62:1 and C.I. P.Y. 17.

For example, Japanese patent JP 50-67841 (1975, Fuji Shikiso K.K.) discloses red shade yellow pigments which are the alkaline earth metal salts of diazotized 2-amino-4-chloro-5-methylbenzene-1-sulfonic acid coupled into various pyrazolone derivatives, including 1-(4'-chlorophenyl)-3-methyl-5-pyrazolone and 1-phenyl-3-carbethoxy-5-pyrazolone.

German Offenlegungsschrift specification No. 2616981 describes the calcium salt of diazotized 2-amino-4,5-dichlorobenzene-1-sulfonic acid coupled into 1-(3'-sulfophenyl)-3-methyl-5 pyrazolone (3-sulfo-PMP) (C.I. Pigment Yellow 183).

U.S. Pat. No. 4,980,458 describes the mixed sodium, ammonium or half-calcium salts of diazotized 2-amino-4,5-dichlorobenzene-1-sulfonic acid coupled into 3-sulfo-PMP. U.S. Pat. No. 4,594,411 describes the calcium salts of diazotized 2-amino-5-acetylaminobenzene-1-sulfonic acid, 2-amino-5-methoxybenzene-1-sulfonic acid, 2-amino-5-methylbenzene-1-sulfonic acid or 2-amino-5-chlorobenzene-1-sulfonic acid coupled into 3-sulfo-PMP.

U.S. Pat. No. 5,047,517 describes the calcium salt of diazotized 2-amino-4-chloro-5-methylbenzene-1-sulfonic acid coupled into 3-sulfo-PMP (C.I. Pigment Yellow 191). German Offenlegungsschrift specification No. 4111348 describes the strontium salt of diazotized 2-amino-4-chloro-5-methylbenzene-1-sulfonic acid coupled into 3-sulfo-PMP.

Also, the pigment from diazotized 3,3'-dichlorobenzidine coupled into 1-(4'-methylphenyl)-3-methyl-5-pyrazolone (PTMP) is known as C.I. Pigment Orange 34.

The pigments described in the above-described patent documents, however, are medium-shade to red-shade yellows. Consequently, there is still a need for green-shade yellow pigments that show improved performance in properties such as color strength and heat stability.

SUMMARY OF THE INVENTION

This invention relates to green shade yellow pigments suitable for use as coloring agents, dye compositions useful in the preparation of such pigments and processes for their preparation.

In one embodiment, this invention relates to a composition comprising one or more compounds characterized by the formula:

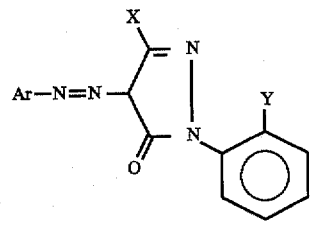

wherein X is a hydrocarbyl, carboxylic acid ester, sulfonic acid ester, carboxylic acid amide or sulfonic acid amide group; Y is a hydrocarbyl, halogen or hydrocarbyloxy group; and Ar is an aromatic moiety characterized by the formula:

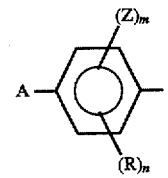

wherein A is a halogen group; each Z is independently a —COOH or —SO$_3$H group, or salts of such groups; m is 1 or 2; each R is independently a halogen, hydrocarbyl, hydrocarbyloxy, carboxylic acid ester, sulfonic acid ester, carboxylic amide, imidazolone, sulfonic acid amide or nitro group; and n is 0, 1 or 2.

In another embodiment, this invention relates to a process for preparing an azo dye which comprises coupling (i) at least one diazonium component of one or more aromatic amines characterized by the formula:

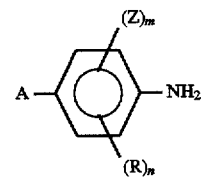

wherein A is a halogen group; each R is independently a halogen, hydrocarbyl, hydrocarbyloxy, carboxylic acid ester, sulfonic acid ester, carboxylic acid amide, imidazolone, sulfonic acid amide or nitro group; n is equal to 0, 1 or 2; each Z is independently a —COOH or —SO$_3$H group, or salts of such groups; and m is equal to 1 or 2; with (ii) at least one coupling component characterized by the formula:

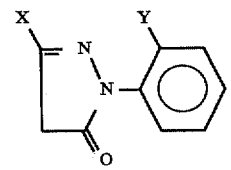

wherein X is a hydrocarbyl, carboxylic acid ester, sulfonic acid ester, carboxylic acid amide or sulfonic acid amide group; and Y is a hydrocarbyl, halogen, or hydrocarbyloxy group.

In still another embodiment, this invention relates to azo dye compositions prepared by the foregoing process and azo pigments prepared by metallization of these dyes.

In one other embodiment, this invention relates to paint, plastic and ink compositions containing the azo pigment compositions of this invention.

DESCRIPTION OF THE PREFERRED EMBODIMENTS

As previously stated, this invention provides azo pigments, azo dyes and processes for their preparation. The azo dyes of the present invention are prepared by initially diazotizing one or more aromatic amines suitable for use in this invention containing at least one acid group or alkali metal or ammonium salts thereof to form a diazonium component and thereafter coupling the diazonium component with a coupling component comprised of a pyrazolone coupler suitable for use in this invention to form the desired dye.

Aromatic amines suitable for the purposes of the present invention are those characterized by the formula:

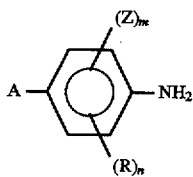

wherein A is a halogen group; each R is independently a halogen, hydrocarbyl, hydrocarbyloxy, carboxylic acid ester, sulfonic acid ester, carboxylic acid amide, imidazolone, sulfonic acid amide or nitro group; n is equal to 0, 1 or 2; each Z is independently a —COOH or —SO$_3$H group, or salts of such groups; and m is equal to 1 or 2.

The term "hydrocarbyl" as used in this specification and claims is intended to include hydrocarbon groups which may contain substituent groups such as ether, ester, nitro or halogen which do not materially affect the hydrocarbon character of the group.

The aromatic amines suitable for use in this invention have a para substituted halogen group and may contain 0, 1 or 2 R groups which are each independently a halogen, hydrocarbyl, hydrocarbyloxy, carboxylic acid ester, sulfonic acid ester, carboxylic acid amide, imidazolone, sulfonic acid amide or nitro group. The halogen group can be any of the halogens, although chlorine and bromine are generally used, with chlorine being the most preferred example of a halogen substituent. The hydrocarbyl groups may independently be alkyl, cycloalkyl, aryl, aralkyl or alkaryl groups. For example, if R is an unsubstituted aryl group, the aromatic amine is a biphenyl amine. When R is an alkyl group, the alkyl group generally will contain from one to four carbon atoms. As used herein, "lower alkyl" shall mean those alkyl groups containing from 1 up to 4 carbon atoms. When R is a hydrocarbyloxy group, the hydrocarbyl moiety may be any of the hydrocarbyl groups discussed above, although the hydrocarbyloxy group generally is an alkoxy group containing from 1 to about 4 or more carbon atoms. Preferred R groups are methyl, ethyl and chloro groups.

The aromatic amines suitable for use in this invention also contain one or two acid groups of —COOH and —SO$_3$H, or salts thereof. In one preferred embodiment, the aromatic amine contains an —SO$_3$H group or salts thereof. Preferably, these acid groups are adjacent (ortho) to the amine group.

Examples of aromatic amines wherein Z is a sulfonic acid group and m is 1 include 2-amino-5-chloro-4-ethylbenzene-1-sulfonic acid, 2-amino-5-chloro-4-methylbenzene-1-sulfonic acid, 2-amino-5-chlorobenzene-1-sulfonic acid, 2-amino-4,5-dichlorobenzene-1-sulfonic acid, 2-amino-5-bromo-4-ethylbenzene-1-sulfonic acid, etc.

Examples of aromatic amines wherein Z is a carboxylic acid group, and m is 1 include 2-amino-5-chloro-4-methoxybenzoic acid, 2-amino-5-chloro-4-methylbenzoic acid, etc. The sulfonic acid and carboxylic acid substituted aromatic amines can be used per se or as their salts. Examples of preferred salts include the alkali metal salts such as the sodium and potassium salts.

Mixtures of two or more of any aromatic amines are within the scope of this invention.

The diazotization of the aromatic amines may be carried out in the manners known to those skilled in the art through the use of alkali metal nitrites or lower alkyl nitrites together with an adequately strong acid such as a mineral acid. Examples of useful mineral acid include hydrochloric acid and sulfuric acid. Nitrosyl sulfuric acid can also be utilized. The diazotization reaction can be conducted at a temperature in the range of from about −20° to +30° C., preferably from 0° to 20° C. Although not required, it may be advantageous in some of the diazotization reactions (and in the subsequent coupling reactions) to include a surface-active agent such as a non-ionic, anionic or cationic surface active agent and, optionally, appropriate organic solvents such as, for example, glacial acetic acid, lower alkanols, dioxane, formamide, dimethyl formamide, dimethyl sulfoxide, pyridine or N-methyl pyrrolidone.

The pyrazolone couplers useful for the purposes of this invention are represented by the formula:

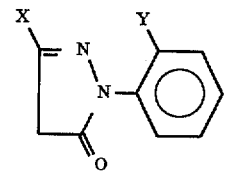

wherein X is a hydrocarbyl, carboxylic acid ester, sulfonic acid ester, carboxylic acid amide or sulfonic acid amide group; Y is a hydrocarbyl, halogen, or hydrocarbyloxy group. Hydrocarbyloxy groups generally contain from 1 up to about 4 carbon atoms. Typically, X is a lower alkyl group containing one or two carbon atoms and is preferably a ethyl group. A useful X group is also a carboxylic acid ester of an alcohol containing 1 or 2 carbon atoms and is preferably an ethyl ester group. Another useful X group is an aryl group, preferably a phenyl group.

Typically, Y is a lower alkyl or halogen group. The halogen group can be any of the halogens, although chlorine and bromine are generally used, with chlorine being the most preferred example of a halogen substituent. Usually, the lower alkyl groups contain one or two carbon atoms and a methyl group is a preferred substituent. A particularly useful embodiment is when Y is a methyl group.

Examples of the pyrazolone couplers useful for the purposes of this invention include 1-(2'-methylphenyl)-3-methyl-5-pyrazolone,
1-(2'-chlorophenyl)-3-methyl-5-pyrazolone,
1-(2'-methoxyphenyl)-3-methyl-5-pyrazolone,
1-(2'-methylphenyl)-3-carbethoxy-5-pyrazolone, etc.

Mixtures of two or more of any of the pyrazolone components are within the scope of this invention.

The coupling reaction useful for the purposes of the present invention may be effected preferably by adding the diazonium components to coupling components, but the coupling components can be added to the diazonium components. Coupling is generally effected at a temperature of from about −20° to about 80° C., preferably from about 20° to about 65° C. As in a diazotization reaction, coupling may be carried out in the presence of an appropriate surface active agent or organic solvent, such as all of those identified above for the diazotization reaction.

In one embodiment, the coupling component is dissolved in a basic solution such as an aqueous alkali metal hydroxide solution and reprecipitated with a dilute acid such as acetic acid.

In another embodiment, generally, the diazonium component is coupled with a slight stoichiometric excess of the coupling component. That is, one equivalent of the diazonium component is coupled with slightly more than one equivalent of the coupling component.

In another embodiment of the present invention, the dispersibility of the pigments of the present invention can be improved by adding alkali-soluble resin-like products before, during, or after the coupling is completed or after the metallization discussed below. Various resin-like materials can be added for this purpose, and these include for example, rosin resins, polymeric rosins, resin soap, chemically modified rosin resins such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulphates and carbonates, titanium dioxide or clay materials or very finely divided organic plastic materials.

The azo dye composition prepared by the above-described coupling reaction can be metallized by a divalent metal salt which forms the sulfonate or carboxylate salt. This is also known as laking and forms the azo pigment. The metal salt may be a salt of alkaline earth metals, manganese, nickel or zinc or mixtures of two or more of these metals. Alkaline earth metal salts are preferred. Alkaline earth metal salts such as $SrCl_2$ and $CaCl_2$ are particularly useful for this purpose. Metallization may be accomplished preferably by adding the metal salt to the dye after coupling of all the diazonium component present is complete or, by including the metal salt in the diazonium component whereby metallization occurs as the dye is formed.

In most applications, it is desirable, in order to achieve the full brightness and tinctorial strength, to heat the azo pigment. For example, the product of the metallization may be heated to reflux temperature for about 1 to 3 hours or at temperatures above 100° C. under pressure in the presence of the above-described resin soaps or other soluble resins.

After completion of the metallization, the azo pigments are recovered from the water-based reaction slurry by filtering to form a presscake of pigment which is washed with hot (e.g., 40°–60° C.) water so as to remove the excess acids, bases and salts formed in the coupling reaction. The presscake is typically washed with from about 10 to 20 times its volume of hot water. The filter cake is generally washed until the filtrate gives only a slightly positive test for chloride ion. The washed presscakes can be dried, ground and used in the form of a coarse or finely divided powder. Alternatively, the azo pigments of this invention can be dispersed into oleoresinous vehicles to prepare flushed bases or dispersed into aqueous vehicles to prepare aqueous dispersions.

The pigment compositions of this invention provide improved color strength, heat stability and are useful as coloring agents in plastics, paints and inks.

This invention, therefore, also relates to paint, ink and plastic compositions comprising major amounts of a paint vehicle, ink vehicle or plastic and minor amounts of the compositions of this invention.

The paint, ink and plastic compositions in which the compositions of this invention are useful are well known to those of ordinary skill in the art. Examples include printing inks, lacquers, thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile. It is also useful for pigment printing and for the pigmenting of paper in the mass.

Due to its excellent heat resistance, the pigment is in particular suitable for the pigmenting of plastics in the mass, such as, for example, of polystyrene and its mixed polymers, polyolefins, in particular polyethylene and polypropylene and the corresponding mixed polymers, polyvinyl chloride and polyesters in particular polyethylene glycol terephthalate and polybutylene terephthalate and the corresponding mixed condensation products based on polyesters.

See, for example, with regard to ink: R. H. Leach, editor, *The Printing Ink Manual*, Fourth Edition, Van Nostrand Reinhold (International) Co.Ltd., London (1988), particularly pages 282–591; with regard to paints: C. H. Hare, *Protective Coatings*, Technology Publishing Co., Pittsburgh (1994), particularly pages 63–288; and with regard to plastics: T. G. Webber, *Coloring of Plastics*, John Wiley & Sons, New York (1979), particularly pages 79–204. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an interior paint formulation along with other pigments which could include titanium dioxide, acrylic lactices, coalescing agents, water or solvents. The pigment may also be used, for example, at a level of 20 to 30% in a plastic color concentrate in polyethylene.

The following examples illustrate the compositions of the present invention and their methods of preparation. Unless otherwise indicated in the following examples and elsewhere in the specification and claims, all parts and percentages are by weight, temperatures are in degrees centigrade and pressures are at or near atmospheric.

EXAMPLE 1

A diazo slurry is prepared by dissolving 22.2 parts 2-amino-5-chloro-4-methylbenzene-1-sulfonic acid (C Amine) in 370 parts hot (~60° C.) water containing 4 parts sodium hydroxide, reprecipitating the C Amine with 26.0 parts 20° Baume hydrochloric acid, adding ice to make a 0° slurry, adding 7.0 parts sodium nitrite dissolved in 21 parts water and stirring the slurry at 0°–10° for 60 minutes.

A coupler slurry is prepared by dissolving 23.0 parts 1-(2'-chlorophenyl)-3-methyl-5-pyrazolone (OCPMP) in 300 parts water containing 4.5 parts sodium hydroxide, reprecipitating the OCPMP with 67.5 parts 10% acetic acid, adjusting the pH to 6.5 and heating the slurry to 65°.

The diazo slurry is coupled into the coupler slurry over a period of 20 minutes, while the pH is maintained at 6.0–6.5 by addition of 10% sodium hydroxide and the temperature is maintained at 60°–65°. The slurry is stirred for one hour, then split to give four equal parts of slurry 1.

EXAMPLE 1-1

To one part (525 parts) of slurry 1 at 40°–45° are added 12.3 parts of 30% calcium chloride dihydrate solution. The slurry is then heated, boiled for 30 minutes, iced to lower than 40° and filtered; the filtercake is washed, dried overnight at 70° and pulverized in an Osterizer to give a fine powder pigment Example 1-1.

EXAMPLE 1-2

The procedure of Example 1-1 is repeated, except that 17.6 parts of 30% strontium nitrate solution are used in place of the calcium chloride solution, to give pigment Example 1-2.

EXAMPLE 1-3

The procedure of Example 1-1 is repeated, except that 42.5 parts of 10% manganous sulfate monohydrate solution are used in place of the calcium chloride solution, to give pigment Example 1-3.

EXAMPLE 1-4

The procedure of Example 1-1 is repeated, except that 24.0 parts of 30% zinc sulfate heptahydrate solution are used in place of the calcium chloride solution, to give pigment Example 1-4.

EXAMPLE 2

The procedure of Example 1-1 is repeated, except that the OCPMP slurry contains 2.2 parts of N-tallowalkyl propylenediamine dissolved in hot 10% acetic acid, the pH is maintained at 5.0–5.2 and the temperature is 27°–25° during coupling, the calcium chloride solution is added at 25° and the pigment slurry is heated to and held at 60°–65° for 10 minutes, to give pigment Example 2.

EXAMPLE 3

The procedure of Example 1-1 is repeated, except that the pH is maintained at 5.0–5.2 and the temperature is 27°–25° during coupling, the pH is raised to 7.1 after coupling, a solution of 4.8 parts Staybelite rosin dissolved in hot 10% sodium hydroxide is added, the calcium chloride solution is added at 27° and the pigment slurry is heated to and held at 60°–65° for 10 minutes, to give pigment Example 3.

EXAMPLE 4

The procedure of Example 1-1 is repeated, except that the OCPMP is not dissolved and reprecipitated and its slurry contains 4.6 parts of the sodium salt of sulfated castor oil and 9.6 parts of sodium acetate, and the calcium chloride solution is added at 65°, to give pigment Example 4.

EXAMPLE 5

The procedure of Example 1-1 is repeated, except that the diazo is made with 23.7 parts of 2-amino-5-chloro-4-ethylbenzene-1-sulfonic acid (Ethyl C Amine) in place of the C Amine, the OCPMP is not dissolved and reprecipitated and its slurry contains 2.3 parts of the sodium salt of sulfated castor oil and 9.6 parts of sodium acetate, and the calcium chloride solution is added at 65°, to give pigment Example 5.

EXAMPLE 6

The procedure of Example 1-1 is repeated, except that the diazo is made with 23.7 parts of 2-amino-5-chloro-4-ethylbenzene-1-sulfonic acid (Ethyl C Amine) in place of the C Amine, the OCPMP slurry contains 2.2 parts of N-tallowalkyl propylenediamine dissolved in hot (~50°) 10% acetic acid, the pH during coupling is maintained at 5.0–5.2 and the temperature is 25°–22°, the pH is raised to 9.2 after coupling, the calcium chloride solution is added at 23° and the pigment slurry is boiled 15 minutes, to give pigment Example 6.

EXAMPLE 7

The procedure of Example 1-1 is repeated, except that the coupler is made with 21.1 parts of 1-(2-methylphenyl)-3-methyl-5-pyrazolone and the calcium chloride is added at 47° to give pigment Example 9.

COMPARATIVE EXAMPLE 1

The procedure of Example 1-1 is repeated, except that the coupler is made with 23.0 parts 1-(4'-chlorophenyl)-3-methyl-5-pyrazolone and 2.2 parts of N-tallowalkyl propylenediamine dissolved in hot (~50°) 10% acetic acid and adjusted to pH 5.2, the pH during coupling is maintained at 5.0–5.2, the calcium chloride solution is added at 100° and the slurry boiled for 10 minutes to give Comparative Example 1.

COMPARATIVE EXAMPLE 2

The procedure of Example 1-1 is repeated, except that the diazo is made with 22.2 parts 2-amino-4-chloro-5-methylbenzene-1-sulfonic acid (2B Acid), the coupler is made with 23.0 parts 1-(4'-chlorophenyl)-3-methyl-5-pyrazolone and 2.2 parts of N-tallowalkyl propylenediamine dissolved in hot (~50°) 10% acetic acid and adjusted to pH 5.2 and 25°, the pH during coupling is maintained at 5.0–5.2 and the temperature is 25°–21°, the calcium chloride solution is added after the slurry is boiled 30 minutes, then boiled for another 10 minutes to give Comparative Example 2.

Testing of Pigments

For coloristic values, the pigments are tested as 1:19 (pigment: titanium dioxide) tints in high density polyethylene injection molded chips, as follows: A mixture of 0.125 part pigment, 2.375 part titanium dioxide and 500 parts high density polyethylene (Solvay T50-2000-G) is shaken on a paint shaker to uniformity, then injection molded at 232° in a 30 ton Battenfeld machine. Spectrophotometric values of the molded chips are measured with a Macbeth Color-Eye (specular component included, large area) to give apparent strengths versus the Ciba Irgalite Yellow WSR (C.I. P.Y. 62:1) and CIE L*C*h hue angles under Illuminant D, 10 degrees, as shown in Table I.

For heat stability, the pigments are tested as 0.1 phr masstones in high density polyethylene injection molded chips, as follows: A mixture of 0.50 part pigment and 500 parts high density polyethylene (Solvay T50-2000-G) is shaken on a paint shaker to uniformity, then injection molded after being held at various temperatures for 90 seconds in a 30 ton Battenfeld machine. Spectrophotometric values of the molded chips are measured with a Macbeth Color-Eye (specular component included, large area) versus chips molded at 232° to give Hunter CIELab delta E, delta L and delta b values, as shown in Table II.

TABLE I

| Pigment | Apparent Strength | Hue Angle |
|---|---|---|
| Yellow WSR (P.Y. 62) | Standard (K/S = 2.6464) | 95.0° |
| Example 1-1 | +76% | 92.5° |
| Example 1-2 | +64% | 92.4° |
| Example 1-3 | +69% | 92.9° |
| Example 1-4 | +44% | 93.3° |
| Example 2 | +62% | 92.1° |
| Example 3 | +18% | 93.5° |
| Example 4 | +77% | 92.6° |
| Example 5 | +78% | 92.5° |
| Example 6 | +65% | 93.2° |
| Example 7 | +68% | 90.6° |
| Comparative Example 1 | +51% | 87.8° |
| Comparative Example 2 | +62% | 84.2° |
| Yellow HGR (P.Y. 191) | +32% | 86.4° |
| Yellow K2270 (P.Y. 183) | +27% | 84.6° |

As seen in Table I, the pigments of the Examples of this invention exhibit a high green-shade hue angle and are much stronger than P.Y. 62 (generally by 60-80%) and generally show significantly stronger color strength than the Comparative Examples, P.Y. 191 and P.Y. 183. In contrast, the pigments of the Comparative Examples are similar in hue to medium/red-shade P.Y. 191 and P.Y. 183 rather than the green shade of the examples of the instant invention. The yellow pigments of the examples of the instant invention unexpectedly exhibit the green-shade of P.Y. 62, whereas the pigments of the Comparative Examples are a medium shade/ red shade expected of pyrazolone pigments of the prior art.

TABLE II

| Temp. | Delta E | | Delta L | | Delta b | |
|---|---|---|---|---|---|---|
| | WSR | Ex. 2 | WSR | Ex. 2 | WSR | Ex. 2 |
| 246° | 2.14 | 0.29 | 0.76 | −0.18 | 0.14 | 0.10 |
| 260° | 4.62 | 1.90 | 1.54 | −0.82 | 0.13 | −0.23 |
| 274° | 7.99 | 2.34 | 2.70 | −0.88 | 0.05 | −0.21 |
| 288° | 8.04 | 2.58 | 2.58 | −0.92 | −0.24 | −0.13 |
| 316° | 7.85 | 1.62 | −3.89 | −0.52 | −5.23 | −0.13 |

As seen in Table II, the pigment of Example 2 shows an insignificant Delta E at 246° and a small (1.6–2.6), but relatively constant, Delta E from 260° to 316°. In contrast, P.Y. 62 (WSR) shows a small Delta E at 246° and large Delta E at 260° to 316°. This lower Delta E demonstrates a significant and unexpected improvement in the heat stability of the instant invention.

What is claimed is:

1. A composition comprising one or more compounds characterized by the formula:

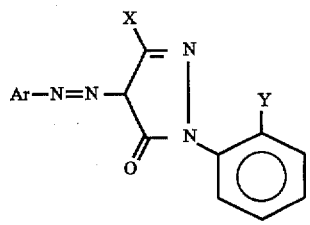

wherein X is a hydrocarbyl, carboxylic acid ester, sulfonic acid ester, carboxylic acid amide or sulfonic acid amide group; Y is a hydrocarbyl, halogen or hydrocarbyloxy group; Ar is an aromatic moiety characterized by the formula:

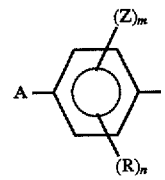

wherein A is a halogen group; each Z is independently a —COOH or —SO$_3$H group, or salts of such groups; m is 1 or 2; each R is independently a halogen, hydrocarbyl, hydrocarbyloxy, carboxylic acid ester, sulfonic acid ester, carboxylic acid amide, imidazolone, sulfonic acid amide, nitro group; and n is 0, 1 or 2.

2. A composition according to claim 1 wherein X is a lower alkyl group.

3. A composition according to claim 1 wherein Ar is of the formula:

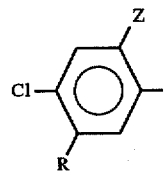

wherein R is a halogen, hydrocarbyl, hydrocarbyloxy, carboxylic acid ester, sulfonic acid ester, carboxylic acid amide, sulfonic acid amide or nitro group; and Z is a —COOH or —SO$_3$H group, or salts thereof.

4. A composition according to claim 1 wherein X is a lower alkyl group and Y is a lower alkyl or chloro group.

5. A composition according to claim 4 wherein X is a methyl group and Y is a chloro group.

6. A composition according to claim 1 wherein n equals 1; R is an ethyl group; Z is a —SO$_3$H group or salt thereof; and m equals 1.

7. A composition according to claim 1 wherein said acid salt is an alkali metal or ammonium salt.

8. A composition according to claim 1 wherein said acid salt is an alkaline earth metal, manganese, nickel or zinc salt.

9. A composition according to claim 1 wherein Ar is of the formula:

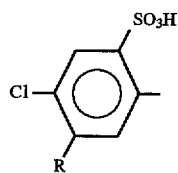

wherein R is a halogen or lower alkyl group.

10. An azo pigment composition comprising one or more compounds of the formula:

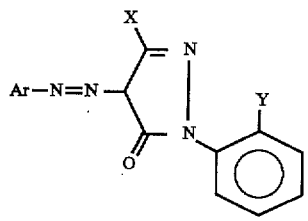

wherein X is a hydrocarbyl, carboxylic acid ester, sulfonic acid ester, carboxylic acid amide or sulfonic acid amide group; Y is a hydrocarbyl, halogen or hydrocarbyloxy group; and Ar is an aromatic moeity characterized by the formula:

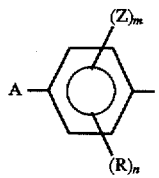

wherein A is a halogen group; each Z is independently a salt of a —COOH or —SO₃H group; m is 1 or 2; each R is independently a halogen, hydrocarbyl, hydrocarbyloxy, carboxylic acid ester, sulfonic acid ester, carboxylic acid amide, imidazolone, sulfonic acid amide or nitro group; and n is 0, 1 or 2.

11. A composition according to claim 10 wherein Z is a sulfonic acid salt of a divalent metal selected from the group consisting of alkaline earth metals, manganese, nickel and zinc.

12. A composition according to claim 10 wherein X and Y are each lower alkyl groups and a equals 1.

13. A composition according to claim 12 wherein X and Y are methyl groups.

14. A composition according to claim 10 wherein n equals 1; R is an ethyl or chloro group.

15. A paint composition comprising a paint vehicle and the composition of claim 10.

16. An ink composition comprising a major amount of ink vehicle and the composition of claim 10.

17. A plastic composition comprising a plastic material and the composition of claim 10.

18. A process for preparing an azo dye which comprises coupling (i) at least one diazonium component of one or more aromatic amines characterized by the formula:

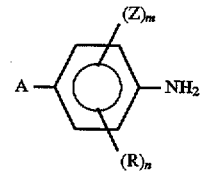

wherein A is a halogen group, each R is independently a halogen, hydrocarbyl, hydrocarbyloxy, carboxylic acid ester, sulfonic acid ester, carboxylic acid amide, imidazolone, sulfonic acid amide or nitro group; n is equal to 0, 1 or 2; each Z is independently a —COOH or —SO₃H group, or salts of such groups; and m is equal to 1 or 2; with (ii) at least one coupling component of the formula:

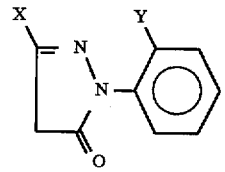

wherein X is a hydrocarbyl, carboxylic acid ester, sulfonic acid ester, carboxylic acid amide or sulfonic acid amide group; and Y is a hydrocarbyl, halogen or hydrocarbyloxy group.

19. A process according to claim 18 wherein X and Y are lower alkyl groups and a equals 1.

20. A process according to claim 18 wherein X and Y are methyl groups; R is an ethyl or chloro groups; n equals 1; Z is a —SO₃H group or salt thereof and m equals 1.

21. A process wherein the azo dye prepared according to claim 18 is metallized with one or more of alkaline earth metals, manganese, nickel or zinc.

22. A composition prepared according to the process of claim 18.

23. A composition prepared according to the process of claim 21.

24. A paint composition comprising a paint vehicle and the composition of claim 23.

25. An ink composition comprising an ink vehicle and the composition of claim 23.

26. A plastic composition comprising a plastic material and the composition of claim 23.

* * * * *